UNITED STATES PATENT OFFICE.

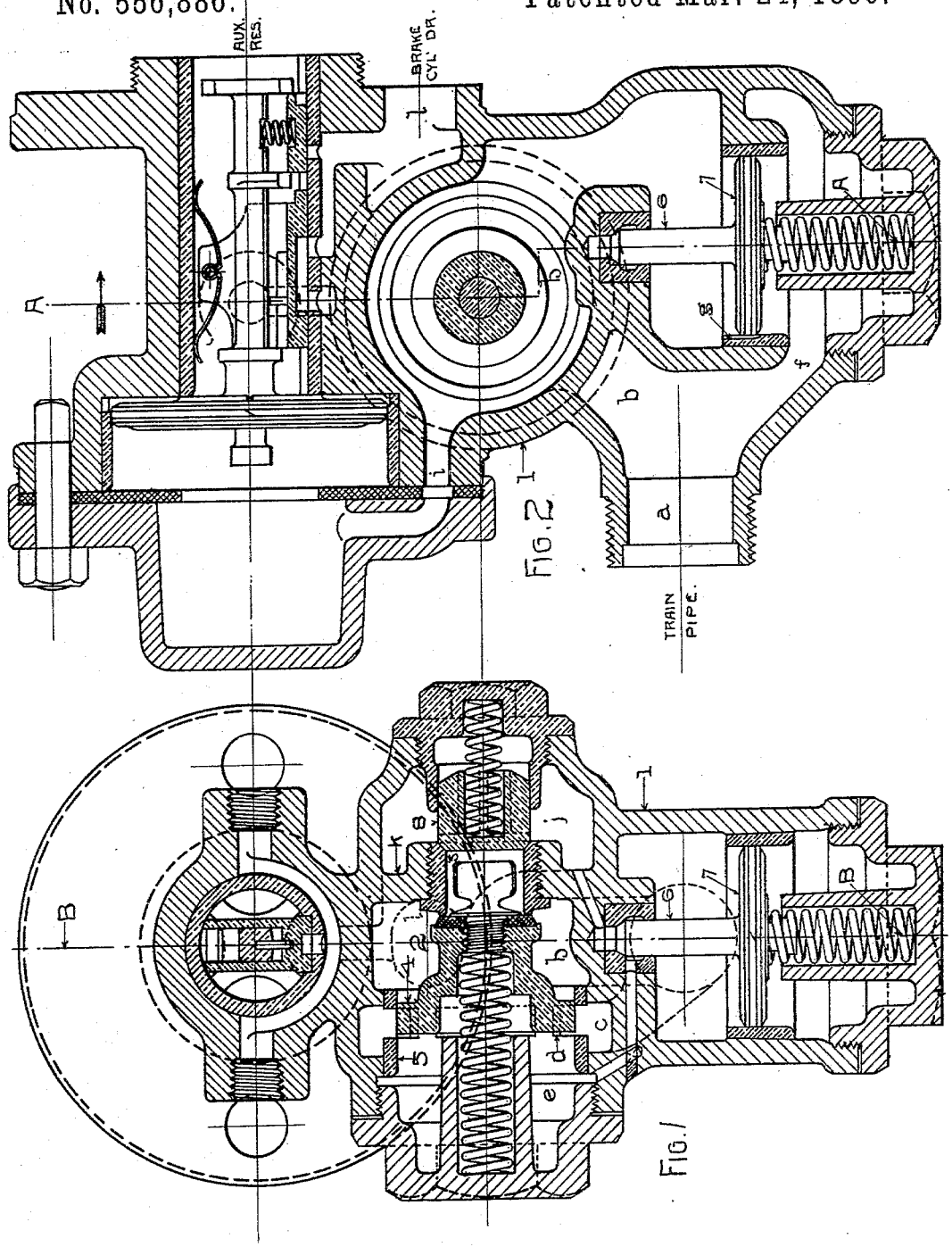

GEORGE W. HAYDEN, OF OAK PARK, ASSIGNOR TO THE CRANE COMPANY, OF CHICAGO, ILLINOIS.

TRIPLE-VALVE MECHANISM.

SPECIFICATION forming part of Letters Patent No. 556,886, dated March 24, 1896.

Application filed March 21, 1895. Serial No. 542,642. (No model.)

*To all whom it may concern:*

Be it known that I, GEORGE W. HAYDEN, a citizen of the United States, residing at Oak Park, Cook county, Illinois, have invented certain new and useful Improvements in Triple-Valve Mechanism for Automatic Air-Brakes, of which the following is a specification.

My invention relates particularly to the class of triple valves shown in Patents No. 496,651, to James T. Hayden, and No. 504,139, to Paul Synnestvedt, and is in the nature of an improvement on the devices therein set forth.

In the constructions referred to a single piston is used to operate both the emergency-valve proper and the small supplemental valve which performs the function of exhausting the pressure from one side of the emergency-piston in quick-action applications. Such a design requires that there be a slight amount of lost motion between the emergency-valve proper and its piston, so the small supplemental valve may open prior to the movement of the large valve. The sliding fit between the stem of the large valve and the emergency-piston has to be a reasonably close one, or the leakage through would destroy, in whole or in part, the operative effect of the pressure, in view of which such construction is very sensitive to interference caused by lodgment in and around the parts of dirt, ice, or oily gum. These difficulties are further aggravated by the use of a wide or trunk piston, which, because of the extent of its bearing-surface, is particularly liable to become stuck from such lodgment of dirt around its circumference.

Another difficulty which has been encountered in the use of the constructions shown in the patents above referred to arises from the smallness of the stem of the supplemental valve, (necessitated by the fact that it must operate inside of the stem of the emergency-valve proper,) the violence of the action in cases of emergency sometimes breaking the stem or upsetting it at the point where the valve seats, so as to prevent its withdrawal.

The above-mentioned defects may result either in so disabling the apparatus that no emergency action is possible, or else in causing the valve to stick open after an application is made, resulting in a total failure to release.

In my invention I aim to obviate these difficulties by providing another piston to operate the small supplemental valve, which is separate from the piston which operates the main emergency-valve. This enables me to so change the other parts and the arrangement of the devices as a whole as to make the apparatus in general much more effective and satisfactory.

Reference being had to the accompanying drawings, Figure 1 is a sectional view of my valve, taken on the broken line A A of Fig. 2. Fig. 2 is a sectional view taken on the line B B of Fig. 1.

The train-pipe, auxiliary-reservoir, and brake-cylinder connections are made as usual and are marked on Fig. 2.

The members for performing the ordinary functions of graduation and release are substantially identical with the corresponding devices shown in the second of the patents above mentioned, and not forming any part of my present invention need no further mention here.

The mechanism provided for the purpose of performing the function of quick action is contained in the lower part of the main casing 1, and consists in general of an emergency-valve 2, controlling an opening 3, an emergency-piston 4, working in a bushing 5, a supplemental valve 6, controlling an exhaust-port from the left side of the piston 4, a supplemental piston 7 for operating said supplemental valve, and a check-valve 8, similar to those commonly used, for preventing the return of the brake-cylinder pressure to the train-pipe in case of rupture of the latter.

As the course of some of the passages is very irregular and difficult to illustrate, it may here be expedient to say that (the parts being in the position shown) air after entering at the train-pipe connection at $a$ passes in two directions—first, upward through the passage $b$ to the cavity $c$, around the bushing 5 and through the port $d$, which is just uncovered by the left edge of the piston 4, filling the chamber $e$, and, second, downward through the passage $f$ to the under side of the piston 7, around the piston by means of the by-pass port $g$, and through the emergency-valve chamber $h$ and the passage $i$ to the left side of the main piston. The port 3 opens into the cavity $j$, which is at all times in open communication with the brake-cylinder through the passage $k$ (shown in dotted lines in Fig. 1) and the opening $l$.

The parts as shown are in the release or normal position, in which the brake-cylinder is in open communication with the atmosphere. In this position it is to be noted that the emergency-valve 2 and the supplemental valve 6 (both of which control openings leading to the brake-cylinder) are held shut by train-pipe pressure assisted by a spring and that the emergency-piston 4 and the supplemental piston 7 are both in a state of equilibrium, each having train-pipe pressure on both sides.

To apply the brakes in service stops, a reduction is made in train-pipe pressure. This causes the air to the left of the main piston to flow back through passage $i$, chamber $h$, and by-pass port $g$ to the train-pipe, the reduction having been made gradually, drawing the main piston back without disturbing the equilibrium of either the emergency-piston 4 or the supplemental piston 7.

On a sudden and extreme reduction, however, in the train-pipe pressure the air to the left of the main piston and in the chamber $h$ flows back more rapidly and, the by-pass $g$ being small, exerts a downward pressure on the supplemental piston 7, draws the valve 6 away from its seat, and thus vents the pressure on the left side of the emergency-piston 4 to the brake-cylinder. The air to the right of the piston then moves it to the left and by opening the emergency-valve 2 and uncovering the circumferential ports $d$ in the bushing 5 vents the remainder of the train-pipe pressure to the brake-cylinder.

As soon as leakage restores the equilibrium of pressure on the opposite sides of the pistons 7 and 4, the parts are returned again to normal position by their respective springs.

Having thus described my invention, what I claim as new, and desire to secure by Letters Patent, is—

In emergency devices for triple-valve mechanism, the combination of: a chamber or casing having a port leading from a train-pipe to a brake-cylinder: an emergency-valve for controlling said port: a piston for operating said emergency-valve: a supplemental port or passage leading from one side of said emergency-piston to the brake-cylinder: a supplemental valve for controlling such supplemental passage: and a separate piston for operating said supplemental valve: substantially as described.

GEORGE W. HAYDEN.

Witnesses:
  CHAS. A. G. WAGMAN,
  E. E. GRANQUIST.